July 15, 1952 G. T. TOKUNAGA 2,603,058
RAKE
Filed May 29, 1950
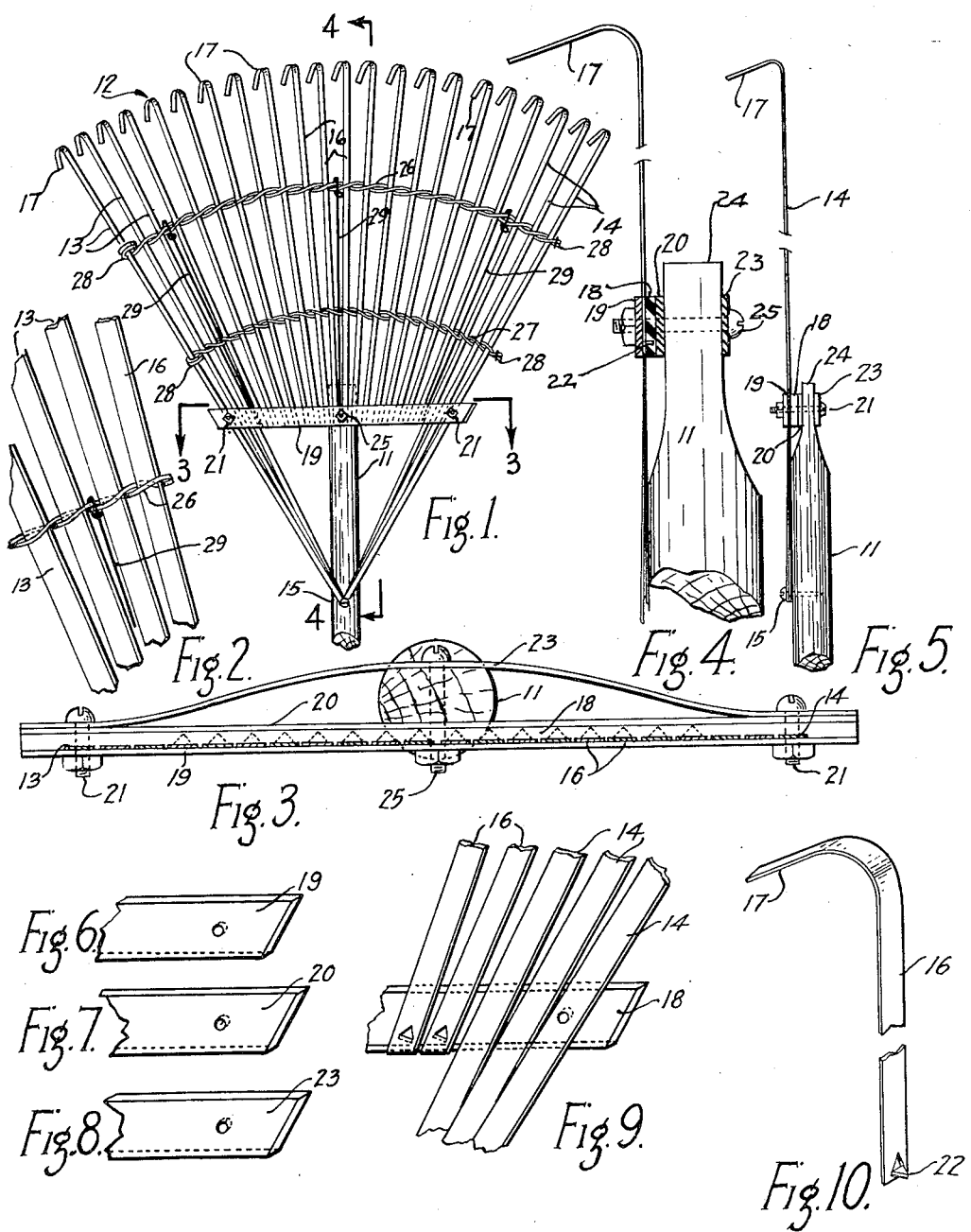
INVENTOR.
GEORGE T. TOKUNAGA
BY
Edward C Healy
ATTORNEY Patented July 15, 1952

2,603,058

UNITED STATES PATENT OFFICE 2,603,058

RAKE

George T. Tokunaga, San Francisco, Calif.

Application May 29, 1950, Serial No. 164,880

1 Claim. (Cl. 56—400.17)

This invention relates to improvements in rakes.

The principal object of the invention is the provision of a plurality of metal blades or tines that are equipped with means to effect a proper spacing of the tines to obtain the most efficient raking operation, means to prevent accidental displacement of the tines from their adjusted positions in their formation of the rake frame, and reinforcing means that is most effective in providing a strong, durable rake structure.

A further object of the invention is the provision of a rake that is simple in construction, economical to manufacture, efficient in operation and highly serviceable in use.

Other objects and advantages will be apparent during the course of the following description.

In the accompanying drawing forming a part of this specification and in which like numerals are employed to designate like parts throughout the same, Fig. 1 is a front elevational view of the rake constructed in accordance with my invention, Fig. 2 is a fragmentary perspective view of a plurality of the blades and disclosing the cords that space the blades and the wire supporting means for the frame, Fig. 3 is an enlarged view partly in section taken on line 3—3 and partly in elevation and disclosing the structure of the rake, Fig. 4 is an enlarged transverse vertical sectional view through the rake, the view being taken on the line 4—4 of Fig. 1, Fig. 5 is a side elevational view of the rake as disclosed in Fig. 1, Figs. 6, 7 and 8 are fragmentary perspective views of the rubber and metal strips employed in the invention, Fig. 9 is a fragmentary perspective view of the arrangement of the tines relative to the rubber strip of the invention, and Fig. 10 is a fragmentary perspective view disclosing means formed in the lower ends of the intermediate tines for contacting the resilient strip of the invention.

In the accompanying drawing wherein for the purpose of illustration is shown the preferred embodiment of my invention the numeral 11 designates a wooden handle portion of the rake while the numeral 12 designates as a whole the triangular formation of the frame of the rake that embodies in its construction a plurality of elongated end metal blades 13 and 14 that are secured to the handle as at 15.

Interposed between the end blades there are approximately sixteen intermediate metal blades 16 of less length than the end blades 13 and 14. Each of the blades is bent over and downwardly at its upper free end to provide an integrally formed rake portion 17 adapted to contact the ground, leaves and the like when the rake is in use.

The means for retaining in position the opposite ends of the intermediate blades to form the triangular frame embodies in its construction a transverse rubber strip 18 that is interposed between a pair of transverse upper and lower metal strips 19 and 20. Suitable fastening means 21 function to retain the respective strips secured and in alignment. It will be noted, as disclosed to advantage in Figs. 9 and 10, that each of the intermediate blades is equipped adjacent its lower extremity with a substantially triangular shaped lip 22 that is struck from the metal of the blade and extends at right angles thereto. These lips are adapted to be embedded in the rubber strip 18 as disclosed to advantage in Fig. 3, and thus prevent accidental longitudinal displacement of the lower ends of the blades from their adjusted position. An arcuate brace 23 is provided on the rear of the rake and secured at its medial portion, adjacent the reduced inner end 24 of the handle, to said handle by a bolt and nut connection 25, which connection is also secured to the medial portion of the respective metal and rubber strips.

To properly space the blades and to reinforce the rake frame, I have employed spaced transverse cords 26 and 27, the ends of which are secured as at 28 to two of the end blades 13 and 14. These cords are intertwined or laced over the respective blades to uniformly space the same. Strengthening wires 29 depend from the cord 26, pass through the cords 27 and have their lower ends clamped into position by pressure thereon of the metal strip 20 and the rubber strip 18.

From the foregoing description considered in connection with the accompanying drawings, it will be obvious that I have produced a structurally strong and unique arrangement of the blades of the rake, whereby the objects of the invention are readily accomplished.

It is to be understood that the form of my invention herewith shown and described is to be taken as a preferred example of the same and that various changes relative to the shape, size, material and arrangement of parts may be resorted to without departing from the spirit of the invention or the scope of the subjoined claim.

Having thus described my invention, I claim:

A rake comprising a handle portion, a plurality of elongated end blades secured thereto, a plurality of intermediate blades interposed between said end blades, the end and intermediate blades defining a substantially triangular rake frame, means for retaining all of said blades in spaced relationship, said means including arcuate cords connected at their extremities to certain of the end blades and being intertwined between the other of the blades, and a pair of metal transverse straps, a rubber strip interposed between said straps, certain of the blades being equipped with pointed lips struck from the material of the intermediate blades and adapted to be imbedded in the rubber strip, and means for reinforcing said frame, said means comprising longitudinally extending wires having their upper ends connected to the said arcuate cords and their opposite ends clamped between one of said metal strips and said rubber strap.

GEORGE T. TOKUNAGA.

REFERENCES CITED

The following references are of record in the file of this patent:

UNITED STATES PATENTS

| Number | Name | Date |
|---|---|---|
| 1,064,206 | Gould | June 10, 1913 |
| 1,752,447 | Maus | Apr. 1, 1930 |
| 1,880,580 | Tokunaga | Oct. 4, 1932 |
| 1,970,903 | De Fraites | Apr. 21, 1934 |